(12) United States Patent
Takahashi

(10) Patent No.: US 9,998,058 B2
(45) Date of Patent: Jun. 12, 2018

(54) CONTROL APPARATUS FOR AC MOTOR

(71) Applicant: DENSO CORPORATION, Kariya, Aichi-pref. (JP)

(72) Inventor: Hidekazu Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days. days.

(21) Appl. No.: 15/484,574

(22) Filed: Apr. 11, 2017

(65) Prior Publication Data
US 2017/0294862 A1    Oct. 12, 2017

(30) Foreign Application Priority Data

Apr. 12, 2016 (JP) ................... 2016-079533

(51) Int. Cl.
*H02P 1/00* (2006.01)
*H02P 27/08* (2006.01)
(Continued)

(52) U.S. Cl.
CPC ............. *H02P 27/08* (2013.01); *H02M 1/44* (2013.01); *H02M 3/1588* (2013.01);
(Continued)

(58) Field of Classification Search
USPC ..... 318/400.2, 400.17, 803; 363/132, 37, 15
See application file for complete search history.

(56) References Cited

U.S. PATENT DOCUMENTS

| | | | |
|---|---|---|---|
| 4,533,986 A * | 8/1985 | Jones ................... | H02M 1/4208 323/222 |
| 7,944,087 B2 * | 5/2011 | Talja ................... | H02M 5/4505 307/33 |

(Continued)

FOREIGN PATENT DOCUMENTS

| JP | 2014-158328 A | 8/2014 |
|---|---|---|
| JP | 5618948 B2 | 11/2014 |

(Continued)

OTHER PUBLICATIONS

U.S. Appl. No. 15/485,580, filed in the name of Hidekazu Takahashi et al.

*Primary Examiner* — Bentsu Ro
*Assistant Examiner* — Iftekhar Mustafa
(74) *Attorney, Agent, or Firm* — Oliff PLC

(57) ABSTRACT

In a control apparatus for an AC motor, a voltage waveform specifying unit of an inverter control unit specifies a voltage waveform for operating the inverter, based on a voltage vector calculated by a voltage command calculation unit. A spectrum amplitude extraction unit acquires values of bus current of the inverter and extracts the spectrum amplitude of the specific frequency that corresponds to the LC resonance frequency of the converter. A boost/non-boost state judgement unit of a converter control unit determines whether the state required by the converter in the next control cycle is the boost state or the non-boost state. When the spectrum amplitude of the specific frequency, correlated with the voltage waveform, is higher than the judgement threshold value and the converter is in the non-boost state, a voltage command value alteration unit changes the voltage command reference value such that the converter transitions to the boost state.

10 Claims, 12 Drawing Sheets

(51) Int. Cl.
*H02P 21/22* (2016.01)
*H02P 27/06* (2006.01)
*H02M 1/44* (2007.01)
*H02M 3/158* (2006.01)
*B60L 11/08* (2006.01)
*H02M 7/5387* (2007.01)
*H02M 1/00* (2006.01)

(52) U.S. Cl.
CPC .............. *H02P 21/22* (2016.02); *H02P 27/06* (2013.01); *B60L 11/08* (2013.01); *H02M 7/53871* (2013.01); *H02M 2001/007* (2013.01); *H02M 2007/53876* (2013.01); *H02P 2201/07* (2013.01)

(56) References Cited

U.S. PATENT DOCUMENTS

| | | | | |
|---|---|---|---|---|
| 8,295,063 B2 * | 10/2012 | Gong | ...................... | H02M 1/12 363/40 |
| 8,879,285 B2 * | 11/2014 | Asakura | ............ | H02M 7/53871 363/132 |
| 2017/0294863 A1 | 10/2017 | Takahashi et al. | | |

FOREIGN PATENT DOCUMENTS

| | | |
|---|---|---|
| JP | 5760934 B2 | 8/2015 |
| JP | 2017-192198 A | 10/2017 |

\* cited by examiner

BUS CURRENT SPECTRUM (FFT)

CONTROL APPARATUS FOR AC MOTOR

CROSS-REFERENCE TO RELATED APPLICATION

This application is based on and claims the benefit of priority from earlier Japanese Patent Application No. 2016-79533 filed Apr. 12, 2016, the descriptions of which are incorporated herein by reference.

BACKGROUND

Technical Field

The present invention relates to a control apparatus for an AC motor, provided with a converter capable of boosting a power source voltage.

Related Art

Types of control apparatus for an AC motor are known in the prior art, where the control apparatus is provided with a converter that boosts a power source voltage by energy from a reactor, with a capacitor being charged to the boosted supply voltage. Furthermore a technique is known whereby the method of controlling the inverter is switched if the target operating point of the AC motor comes within the LC resonance region of the converter.

For example with the drive apparatus disclosed in Japanese Patent No. 5760934, when the target operating point of the AC motor comes within the LC resonance region of the converter, use of a rectangular-waveform control method is halted and the inverter is controlled using a sine-waveform control method. As a result, it becomes possible to suppress voltage fluctuation that is produced when the frequency of the 6th- order harmonic component of the rectangular-waveform voltage coincides with the LC resonance frequency.

A problem in the prior art is voltage fluctuation that is caused by resonance, when a specific frequency in the amplitude spectrum of the bus current of a converter coincides with the LC resonance frequency of the converter. With the technique of Japanese Patent No. 5760934, and this may result in increased system losses, since the sine-waveform control method is always applied in such a circumstance.

In consideration of the foregoing, exemplary embodiments of the present invention are directed to providing a control apparatus for an AC motor which suppresses voltage fluctuation caused by coincidence between a specific frequency in the amplitude spectrum of the inverter bus current and the LC resonance frequency of the converter, while reducing system losses.

SUMMARY

In accordance with an exemplary embodiment of the present invention, there is provided a power converter control apparatus according to the present invention includes a converter, an inverter, a converter control unit, an inverter control unit, and a spectrum amplitude extraction unit.

The converter can boost the power source voltage supplied from a DC power source to a desired system voltage by operation of a high-potential side switching element and low-potential side switching element.

The inverter converts the DC power at the system voltage that is outputted from the converter into AC power, by the operation of a plurality of switching elements, and supplies the AC power to an AC motor.

The converter control unit calculates a voltage command value for the system voltage and controls the operation of the converter.

The inverter control unit includes a voltage command calculation unit for calculating a voltage vector which is supplied (as a command quantity) to the inverter, and a voltage waveform specification unit which specifies a voltage waveform for operating the inverter based on the voltage vector.

The spectrum amplitude extraction unit acquires the values of bus current of the inverter, and extracts the spectrum amplitude of the bus current at a specific frequency, which corresponds to the LC resonance frequency of the converter through which the bus current flows.

The converter control unit includes a voltage command reference value calculation unit, a boost state/non-boost state judgement unit, and a voltage command value alteration unit.

The voltage command reference value calculation unit calculates a voltage command reference value, as a reference value of the voltage command value, based on the torque and rotation speed of the AC motor.

The boost state/non-boost state judgement unit judges whether or not the state required by the converter in the next control cycle is "the boost state, in which the power source voltage is boosted and outputted" or "the non-boost state, in which the power source voltage is outputted without being boosted". The "boost state" may be defined, for example, as "a state in which the high-potential side and low-potential side switching elements are continuously being alternately switched to the ON state and the OFF state".

If the spectrum amplitude of the bus current at the specific frequency (correlated with the voltage waveform) exceeds the judgement threshold value, and the judgement result by the boost state/non-boost state judgement unit is "non-boost state", the voltage command value alteration unit changes the voltage command reference value such as to set the converter in the boost state.

Preferably, the voltage command value alteration unit changes the voltage command reference value to a value that is greater than the power source voltage value, when a transition is to be made from the non-boost state to the boost state.

For example with the current mode control method of controlling the output voltage of the converter based on detected values of reactor current, when a transition to the boost state is performed and the output voltage of the converter thereby suddenly changes together with the change in reactor current, control can be applied such that the output voltage of the converter is quickly brought into coincidence with the command voltage. That is, voltage fluctuation can be suppressed by promptly bringing the converter into the boost state.

In view of the above, with the present invention, when the spectrum amplitude of the bus current at the specific frequency exceeds the judgement threshold value and the converter is in the non-boost state, the voltage command reference value is changed such as to set the converter in the boost state. Thus with the present invention it is possible to effectively suppress fluctuation of the output voltage of the converter, without using the prior art technique of always applying sinusoidal waveform control when the target operating point of the AC motor comes within the LC resonance region of the converter and thereby increasing system losses.

DESCRIPTION OF SPECIFIC EMBODIMENTS

Figure 1:
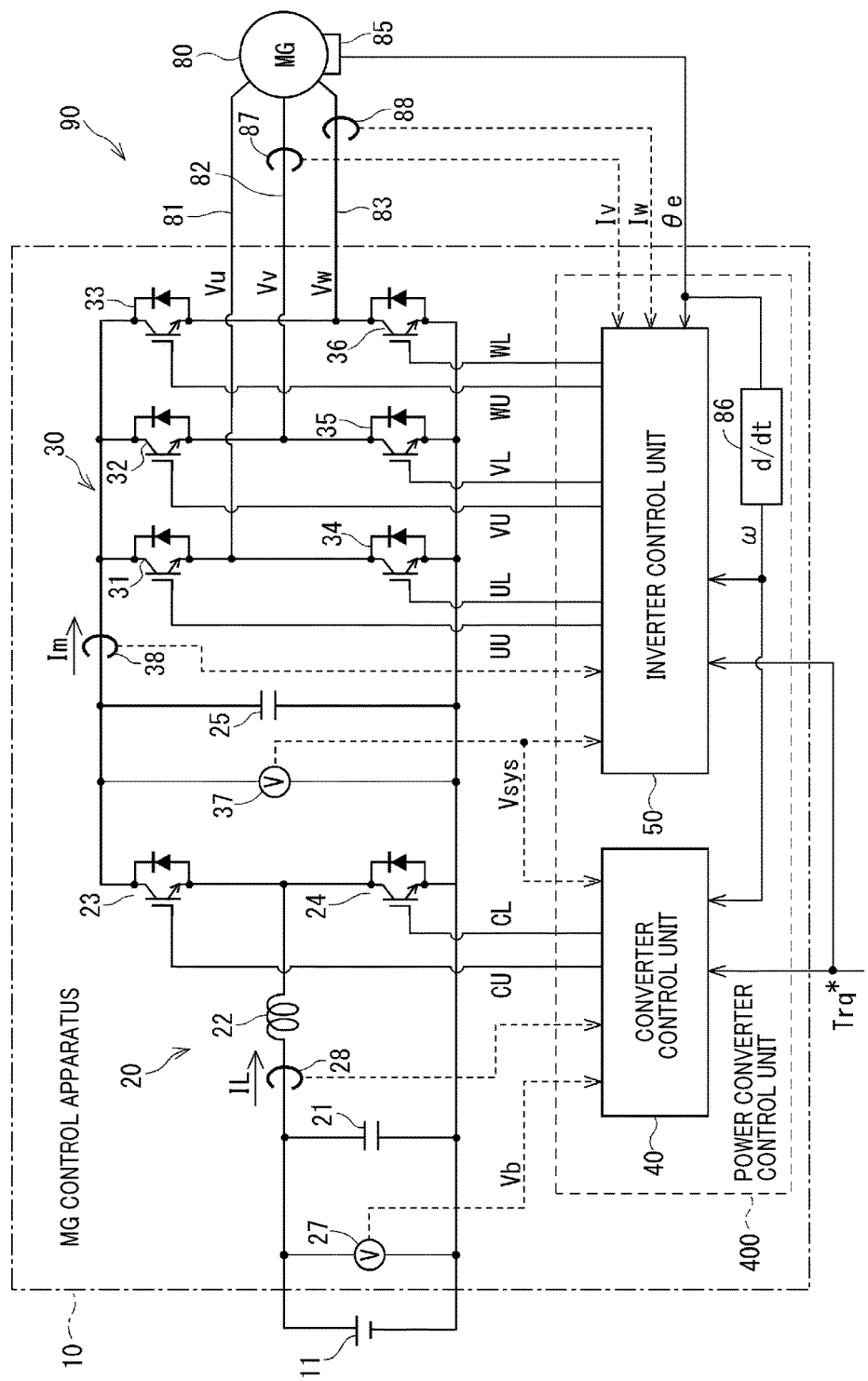
FIG. 1 is a schematic configuration diagram of an MG (motor/generator) drive system to which each of respective embodiments of a control apparatus for an AC motor is applied.

Embodiments of a control apparatus for an AC motor are described in the following referring to the drawings. With the second and third embodiments the basic configuration, other than the configuration relating to judgement of the boost/non-boost state shown in FIG. 9, is the same as for the first embodiment. The embodiments are each referred to as "this embodiment" in the following.

This embodiment of an AC motor control apparatus controls energization of a motor/generator that is a three-phase AC motor (hereinafter designated as MG) in a system that drives the MG as the motive power source of a hybrid electric vehicle or electric vehicle. "MG" and "MG control apparatus" of each embodiment correspond to "AC motor" and "AC motor control apparatus" recited in the claims.

System Configuration

The overall configuration of a MG drive system to which the MG control apparatus of each embodiment is applied will be described referring to the FIG. 1, which illustrates a system containing one MG.

The converter 20 of the MG drive system 90 boosts the voltage of a battery 11, which is a rechargeable secondary battery used as a power source, to a desired system voltage Vsys, and converts the boosted DC power to three-phase AC power which is supplied to the MG 80.

In the MG drive system 90, the MG control apparatus 10 mainly consists of a converter 20, an inverter 30, a converter control unit 40 and an inverter control unit 50. The converter control unit 40 and the inverter control unit 50 are collectively referred to in the following as the power converter control unit 400. It should be noted that the MG control apparatus 10 can be similarly applied to an MG drive system having two or more MGs.

The MG 80 is, for example, a permanent magnet type of synchronous three-phase AC motor. In the present embodiment, the MG 80 functions both as an electric motor for generating torque for driving the drive wheels of a hybrid vehicle, and as a generator for recovering energy produced by torque transmitted from the engine and the drive wheels.

Current sensors are respectively connected in the current paths of two out of the three phase windings 81, 82, 83 of the MG 80, for detecting the phase currents. In the example of FIG. 1, current sensors 87 and 88 for detecting the phase currents Iv and Iw are provided in the current paths connected to the V-phase winding 82 and the W-phase winding 83 respectively, and the remaining U-phase current Iu is estimated based on Kirchhoff's law. With other embodiments, any two of the three phase currents may be detected. Alternatively, a technique of estimating two of the phase currents based on the detected value of one phase current could be employed.

The electrical angle $\theta e$ of the MG 80 is detected by a rotation angle sensor 85 such as a resolver.

In the following, the boost operation of the converter 20, when the MG 80 is operating to supply power to the MG, will be described.

The converter 20 includes a filter capacitor 21, a reactor 22, a high-potential side switching element 23, a low-potential side switching element 24, etc.

The filter capacitor 21 is provided in the input part of the converter 20 and excludes power source noise from the battery 11. One end of the reactor 22 is connected to the battery 11 and the other end is connected to the junction point between the high-potential side switching element 23 and the low-potential side switching element 24. The reactor 22 accumulates electrical energy, and generates induced voltage as the current changes.

The high-potential side switching element 23 and the low-potential side switching element 24 are connected in series between the bus of the inverter 30 and the low potential electrode of the battery 11, and are turned on and off in complementary operation by gate signals CU and CL respectively, supplied from the converter control unit 40.

When the high-potential side switching element 23 is off and the low-potential side switching element 24 is on, reactor current IL flows through the reactor 22 which thereby accumulates energy.

When the high-potential side switching element 23 is on and the low-potential side switching element 24 is off, the energy accumulated in the reactor 22 is released so that the system voltage Vsys, boosted by the battery voltage Vb, charges the smoothing capacitor 25.

The voltage sensor 27 detects the battery voltage Vb. The current sensor 28 detects the reactor current IL.

In the inverter 30, the six switching elements 31 to 36 of the upper and lower arms are connected in a bridge configuration. Specifically, the switching elements 31, 32, and 33 are the switching elements of the U-phase, V-phase, and W-phase upper arms respectively, and the switching elements 34, 35, and 36 are the switching elements of the U-phase, V-phase, and W-phase lower arms respectively. Each of the switching elements 31 to 36 consists for example of an IGBT (insulated gate bipolar transistor), connected in parallel with a freewheeling diode which allows current to flow from the low-potential side to the high-potential side.

The inverter 30 converts DC power into three-phase AC power by operating the switching elements 31 - 36 in accordance with gate signals UU, UL, VU, VL, WU, WL from the inverter control unit 50. Phase voltages Vu, Vv, Vw, corresponding to the voltage command calculated by the inverter control unit 50, are applied to respective phase windings 81, 82, 83 of the MG 80. The smoothing capacitor 25 smoothes the system voltage Vsys that is inputted to the inverter 30. The voltage sensor 37 detects the system voltage Vsys, and the current sensor 38 detects the bus current Im of the inverter 30. With another embodiment, the current sensor 38 is omitted and the value of bus current Im is obtained by another method, through calculation as described hereinafter.

The power converter control unit 400 containing the converter control unit 40 and the inverter control unit 50 is constituted by a microcomputer, etc., and internally incorporates a CPU, ROM and I/O (not shown), and a data bus etc., for interconnecting these components. The microcomputer executes software processing through execution of a previously stored program by the CPU, and through hardware processing control using dedicated circuitry.

The converter control unit 40 acquires information such as the battery voltage Vb detected by a voltage sensor 27, the reactor current IL detected by a current sensor 28, the system voltage Vsys inputted to the inverter 30, etc. The converter control unit 40 calculates a voltage command value for the system voltage Vsys based on a torque command Trq* and the rotation speed ω of the MG 80.

Details of the boost control by the converter control unit 40 are described hereinafter.

The inverter control unit 50 acquires the system voltage Vsys, the bus current Im, the two phase currents Iv and Iw and the electrical angle θe, detected by respective sensors. In addition, the inverter control unit 50 acquires the value of electrical angular velocity ω (deg/s) from the differentiator 86, obtained by differentiating the electrical angle θe with respect to time. The electrical angular velocity ω is converted into a value of rotation speed N [rpm] by being multiplied by a proportionality constant. Hence in the present disclosure "rotation speed obtained by conversion of electrical angular velocity ω" is referred to simply as the "rotation speed ω". It should be noted that the differentiator 86 could be provided within the inverter control unit 50.

The inverter control unit 50 also receives the torque command Trq*, from a high-level control circuit.

Based on these items of information, the inverter control unit 50 calculates the gate signals UU, UL, VU, VL, WU, WL for operating the inverter 30. The inverter 30 operates the switching elements 31-36 in accordance with the gate signals UU, UL, VU, VL, WU, WL, thereby converting the DC power from the battery 11 into AC power, which is supplied to the MG 80.

With the MG control apparatus 10 having such a configuration, resonance occurs in a LC resonance circuit that is formed by the reactor 22 of the converter 20 and the smoothing capacitor 25, at a resonance frequency fr which is expressed by equation (1.1) below.

$$fr = d/\{2\pi\sqrt{(LC)}\} \quad (1.1)$$

Here,
L: Inductance of LC resonance circuit
C: Capacitance of LC resonance circuit
d: boost duty ratio If the output voltage from the inverter 30 has a rectangular waveform, high-frequency components consisting of a 6th-order harmonic and multiples of the 6th- order harmonic (collectively referred to in the following as the "6th- order harmonic component") will be present in the amplitude spectrum of the bus current Im of the inverter 30. The frequency fh of the 6th- order harmonic component is expressed by equation (1.2) below.

$$fh = pN/60 \quad (1.2)$$

Here,
p: number of pole pairs of the MG
N: rotation speed of the MG [rpm]

From equations (1.1) and (1.2), the rotation speed N at which the 6th-order harmonic frequency fh coincides with the LC resonance frequency fr is obtained from equation (1.3) below.

$$N = d \times 60/\{2\pi p\sqrt{(LC)}\} \quad (1.3)$$

Figure 2:
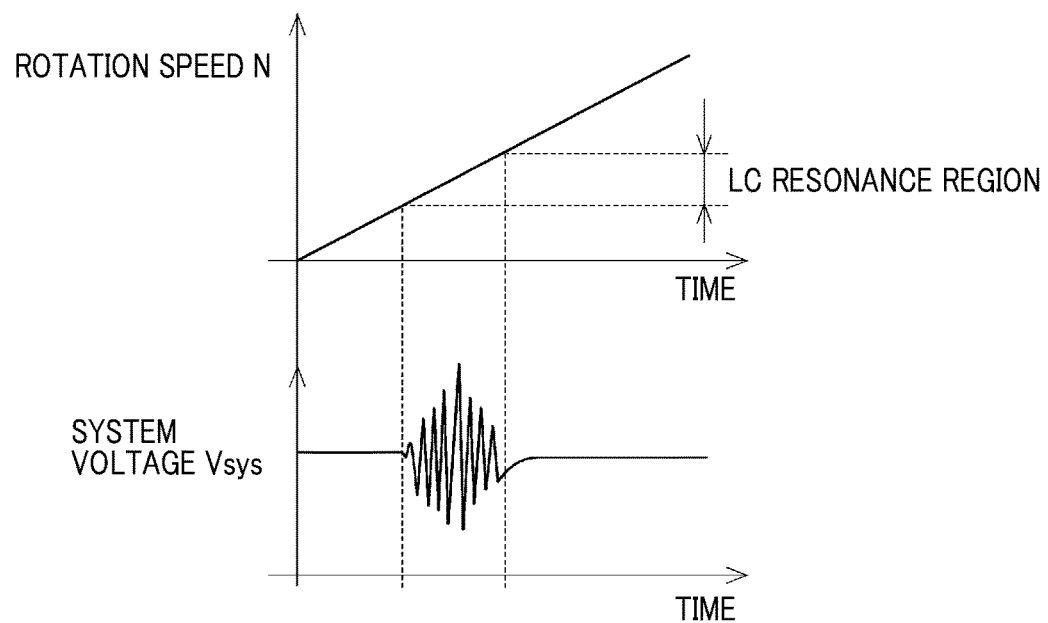
FIG. 2 is a diagram showing voltage fluctuation in an LC resonance region.

Hence as shown in FIG. 2, when the rotation speed N of the MG 80 increases with time, fluctuation of the system voltage Vsys occurs during an interval in which the rotation speed N coincides with the LC resonance region.

The present embodiment is characterized by the configuration of the power converter control unit 400 for suppressing such voltage fluctuation. The configurations of the converter control unit 40 and the inverter control unit 50 are described in detail in the following.

Configuration and Operation of Inverter Control Unit

The configuration and operation of the inverter control unit 50 will first be described, referring to FIGS. 3 to 5.

Figure 3:
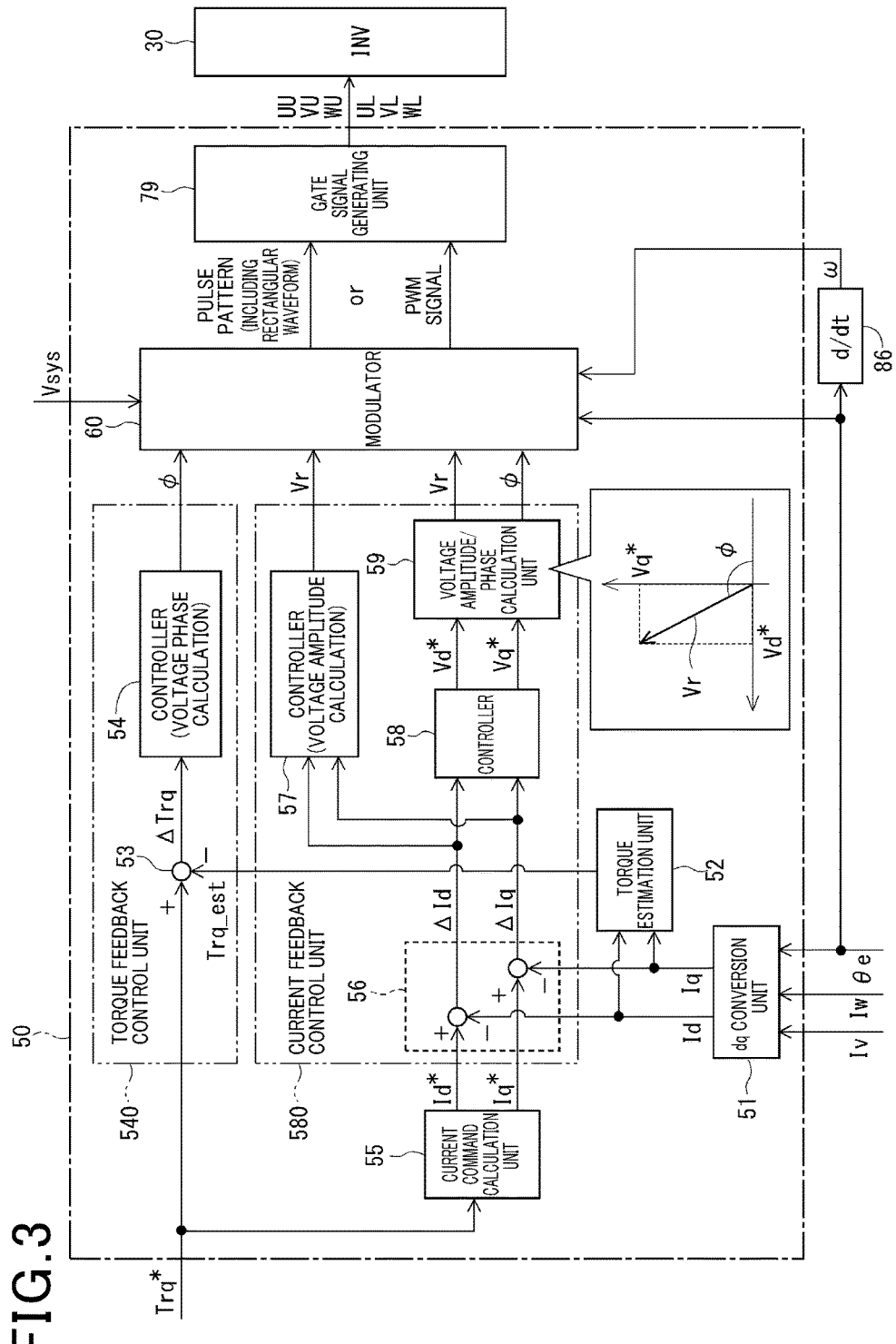
FIG. 3 is a control block diagram of an inverter control unit of each of the embodiments.

As shown in FIG. 3, the inverter control unit 50 includes a dq conversion unit 51, a torque estimation unit 52, a torque subtractor 53, a controller 54, a current command calculation unit 55, a current subtractor 56, a controller 57, a controller 58, a voltage amplitude/phase calculation unit 59, a modulator 60, a gate signal generating unit 79, etc. Of these, the controller 57, the controller 58, and the voltage amplitude/phase calculation unit 59 may be selectively provided, in accordance with the configuration of the feedback control unit (designated as "FB control unit" in FIG. 3).

Each of the torque feedback control unit 540 and current feedback control unit 580 functions as a "voltage command calculation unit", which calculates a voltage vector that is supplied to the inverter 30 as a command vector. In the following description, "voltage vector" basically signifies "voltage command vector".

The dq converter 51 converts the values of the phase currents, acquired from the current sensors 87 and 88, into values of dq axis currents Id and Iq based on the electrical angle θe, and performs feedback of the dq axis current values to the current subtractor 56.

Based on the values of the dq axis currents Id, Iq and the motor constants of the MG 80, the torque estimating unit 52 calculates an estimated torque value Trq_est, using equation (2) below.

In a system in which the MG 80 incorporates a torque sensor, a torque detection value can be acquired from the torque sensor, so that the torque estimation unit 52 may be omitted.

$$Trq\_est = p \times \{Iq \times \psi + (Ld - Lq) \times Id \times Iq\} \quad (2)$$

Here,
p: Number of pole pairs of the MG
ψ: inverse voltage constant
Ld, Lq: d-axis inductance, q-axis inductance The torque feedback controller 540 includes a torque subtractor 53 and a controller 54.

The torque subtractor 53 calculates a torque deviation ΔTrq between the torque command value Trq* and the estimated torque value Trq_est. The controller 54 calculates the voltage phase φ by PI calculation, such as to make the torque deviation ΔTrq converge to zero, and outputs the calculated value of φ to the modulator 60. In that way, the torque feedback control unit 540 calculates the phase φ of the voltage vector as an operation quantity for feedback control of the torque of the MG 80.

Based on the torque command Trq*, the current command calculation unit 55 calculates the dq-axis current command values Id*, Iq*, for example by using a map or mathematical equation, such as to obtain the maximum amount of torque per unit of current.

As shown in FIG. 3, with a configuration in which the inverter control unit 50 is provided with torque feedback control unit 540, the current feedback control unit 580 includes a current subtractor 56 and a controller 57.

The current subtractor 56 calculates the current deviations ΔId and ΔIq between the dq-axis current commands Id* and Iq* and the respective dq-axis currents Id and Iq, which are fed back from the dq converter 51. The controller 57 calculates the voltage amplitude Vr by PI calculation, such as to make the current deviations ΔId and ΔIq converge to zero, and outputs the calculated value of voltage amplitude Vr to the modulator 60. The current feedback control unit 580 thereby calculates the amplitude Vr of the voltage vector, as an operation amount for feedback control of the current flowing through the MG 80.

Hence with the torque feedback control unit 540 and the current feedback control unit 580 cooperating to constitute a "voltage command calculation unit", the voltage phase φ calculated by the controller 54 of the torque feedback control unit 540 and the voltage amplitude Vr calculated by the controller 57 of the current feedback control unit 580 are outputted to the modulator 60.

However it would be equally possible for the torque feedback control unit 540 to be omitted from the inverter control unit 50, with the current feedback control unit 580 alone constituting the "voltage command calculation unit". With such a configuration, the current feedback controller 580 will consist of the current subtractor 56, the controller 58 and the voltage amplitude/phase calculation unit 59.

In that case, the controller 58 calculates the dq axis voltage commands Vd*, Vq* by PI calculation, such as to make the current deviations ΔId, ΔIq converge to zero. The voltage amplitude/phase calculation unit 59 converts the dq axis voltage commands Vd*, Vq* into the voltage amplitude Vr and the voltage phase φ, and outputs these to the modulator 60.

Although the voltage phase φ is shown with reference to the d axis in FIG. 3, it is equally possible to define φ based on the q axis.

In addition to the voltage amplitude Vr and the voltage phase φ, the modulator 60 receives information such as the system voltage Vsys, the electrical angle θe, the rotation speed ω, etc. Based on these items of information, the modulator 60 outputs a pulse pattern or a PWM signal as the output waveform of a pulse voltage for operating the inverter 30.

Figure 4:
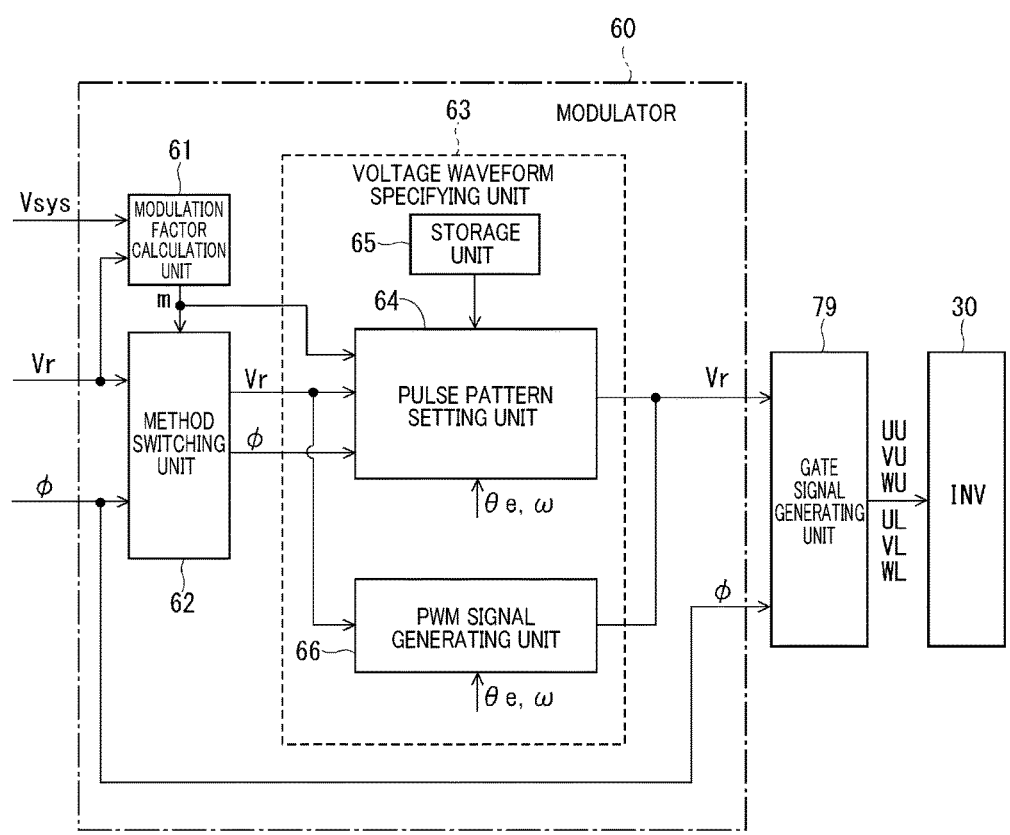
FIG. 4 is a control block diagram of a modulator of each of the respective embodiments.

As shown in FIG. 4, the modulator 60 includes a modulation factor calculation unit 61, a method switching unit 62, and a voltage waveform specifying unit 63. The voltage waveform specifying unit 63 includes a pulse pattern setting unit 64, a storage unit 65, and a PWM signal generating unit 66.

The modulation factor calculation unit 61 calculates the modulation factor m using equation (3) below, based on the voltage amplitude Vr that is outputted from the current feedback control unit 580 and on the system voltage Vsys.

$$m = 2\sqrt{(2/3)} \times (Vr/Vsys) \quad (3)$$

The method switching unit 62 switches the method of specifying the voltage waveform by the voltage waveform specifying unit 63, based on the modulation factor m, etc.

Figure 5A:
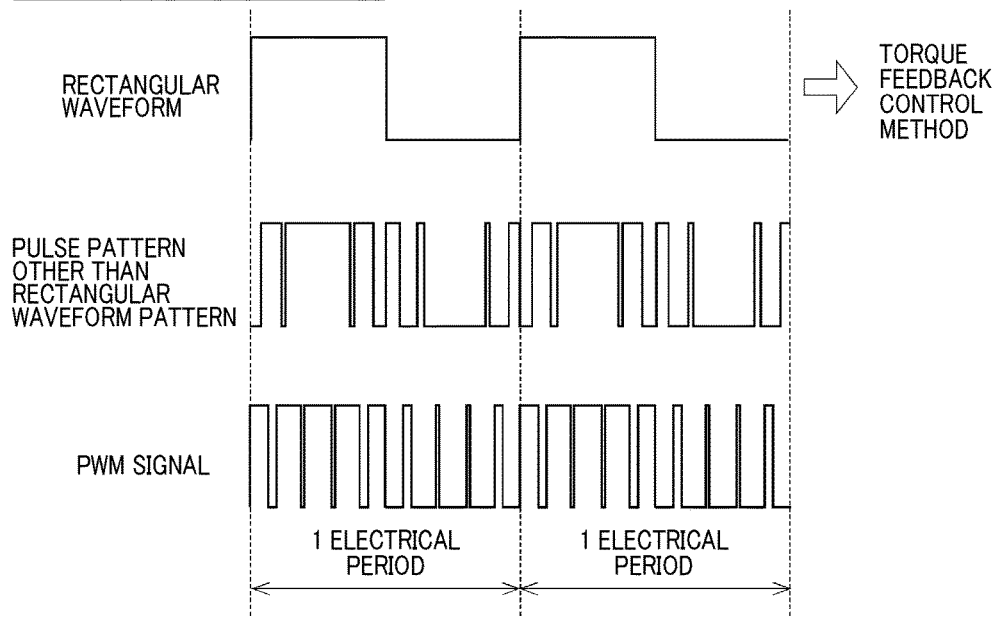
FIG. 5A is a diagram of an example of the waveform of a phase voltage.

FIG. 5A shows an example of a voltage waveform.

A pulse pattern is a voltage waveform selected by the pulse pattern setting unit 64 in accordance with the modulation factor m, the rotation speed ω etc., from a plurality of voltage waveforms that are stored beforehand in the storage unit 65.

In the present disclosure, the meaning of "pulse pattern" includes that of a rectangular-waveform pattern having a single rectangular-waveform pulse in each period. Since the modulation factor m of the rectangular-waveform pattern is fixed at 1.27, the voltage amplitude Vr is held constant during rectangular-waveform control, with only the voltage phase φ being varied. When rectangular-waveform control is applied to a three-phase AC motor, the phase voltages and phase currents contain a high proportion of the 6th order harmonic component and harmonic components that are multiples of the 6th order harmonic.

A pulse pattern other than the rectangular-waveform pattern is defined by the number of pulses in one period, and the position and width of each pulse in one period, which are determined in accordance with the modulation factor m, the rotation speed ω, etc.

The PWM signal is generated in the PWM signal generating unit 66 by comparing the phase voltage, calculated based on the output of the current feedback control unit 580, with the carrier wave. More specifically, the duty ratio converted from the phase voltage is compared with the carrier wave.

The voltage waveform specifying unit 63 contains at least one of a pulse pattern setting unit 64 and a PWM signal generating unit 66.

If the modulation factor is less than 1.27, the method switching unit 62 selects a PWM signal or a pulse pattern other than a rectangular waveform, to be specified as the voltage waveform. In the case of the PWM signal, sine wave PWM is used when the modulation factor is in the range 0 to 1.15, and overmodulation PWM is used in the range of modulation factors 1.15 to 1.27.

In addition, the method switching unit 62 selects a rectangular waveform when the modulation factor is 1.27. Accordingly, when the voltage waveform specified by the voltage waveform specifying unit 63 is a rectangular waveform, the inverter control unit 50 halts the control by the current feedback control unit 580, and the torque feedback control unit 540 calculates the voltage vector.

In that way, the voltage waveform of the pulse pattern or PWM signal that is specified by the voltage waveform specifying unit 63 is outputted to the gate signal generating unit 79. The gate signal generator 79 generates the gate signals UU, UL, VU, VL, WU, WL based on this voltage waveform, outputted from the modulator 60, and outputs these gate signals to the switching elements 31-36 of the inverter 30.

Configuration and Operation of Converter Control Unit

The configuration and operation of the converter control unit 40 will next be described, referring to FIGS. 6 to 12.

Figure 6:
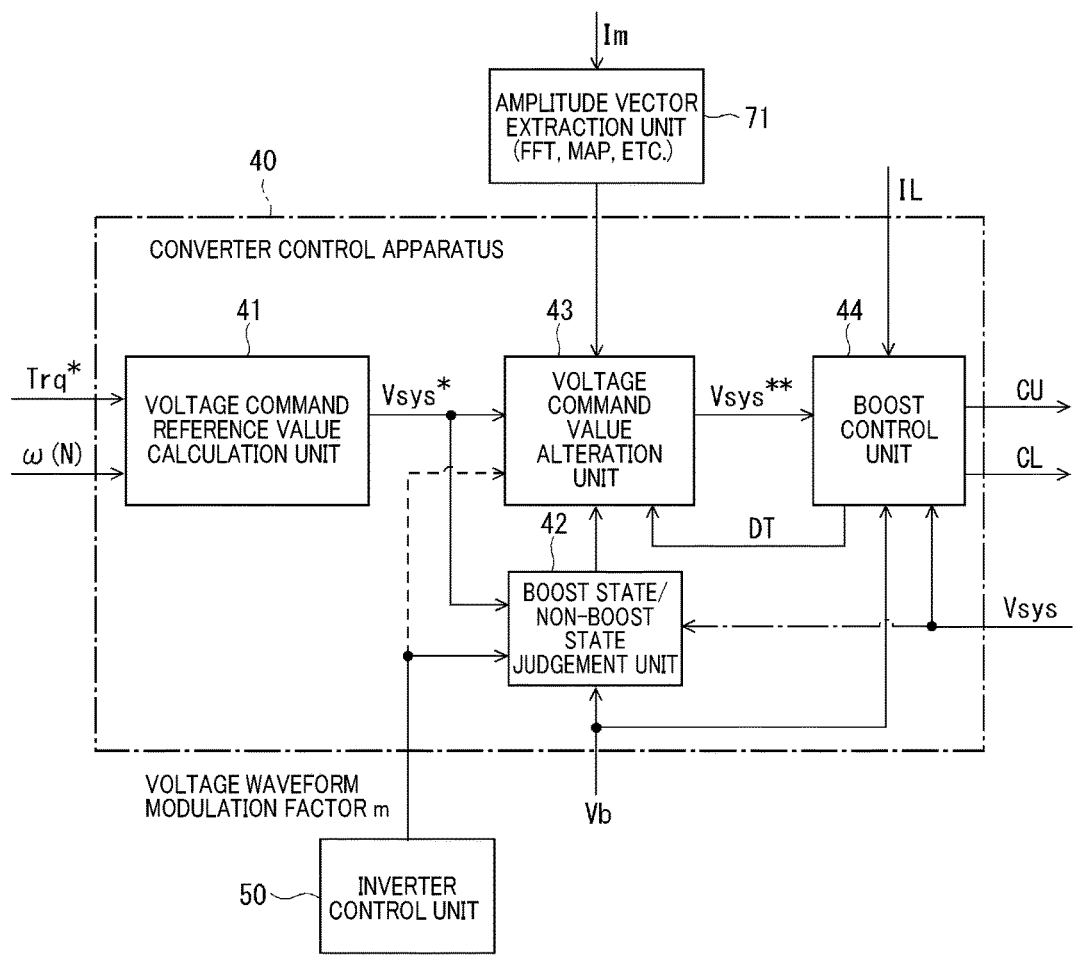
FIG. 6 is a control block diagram of a converter control unit of each of the embodiments.

As shown in FIG. 6, the converter control unit 40 includes a voltage command reference value calculation unit 41, a boost state/non-boost state judgement unit 42, a voltage command value alteration unit 43, a boost control unit 44, etc.

The voltage command reference value calculation unit 41 calculates a voltage command reference value Vsys*, which is a system request voltage, based on the torque command Trq* and the rotation speed ω (or N) of the MG 80.

With the first embodiment, which is a basic example, the boost/non-boost state judgement unit 42 acquires the power source voltage Vb and the voltage command reference value Vsys*. In addition, the detected value of the system voltage Vsys and information on the voltage waveform and the modulation factor m, specified by the modulator 60 of the inverter control unit 50, are acquired, in accordance with the boost/non-boost state judgement configuration.

The boost/non-boost state judgement unit 42 judges whether the state of the converter 20 required in the next control cycle is to be the boost state or the non-boost state, based on these items of information. Details of the boost/non-boost state judgement configuration are described hereinafter.

Figure 8:
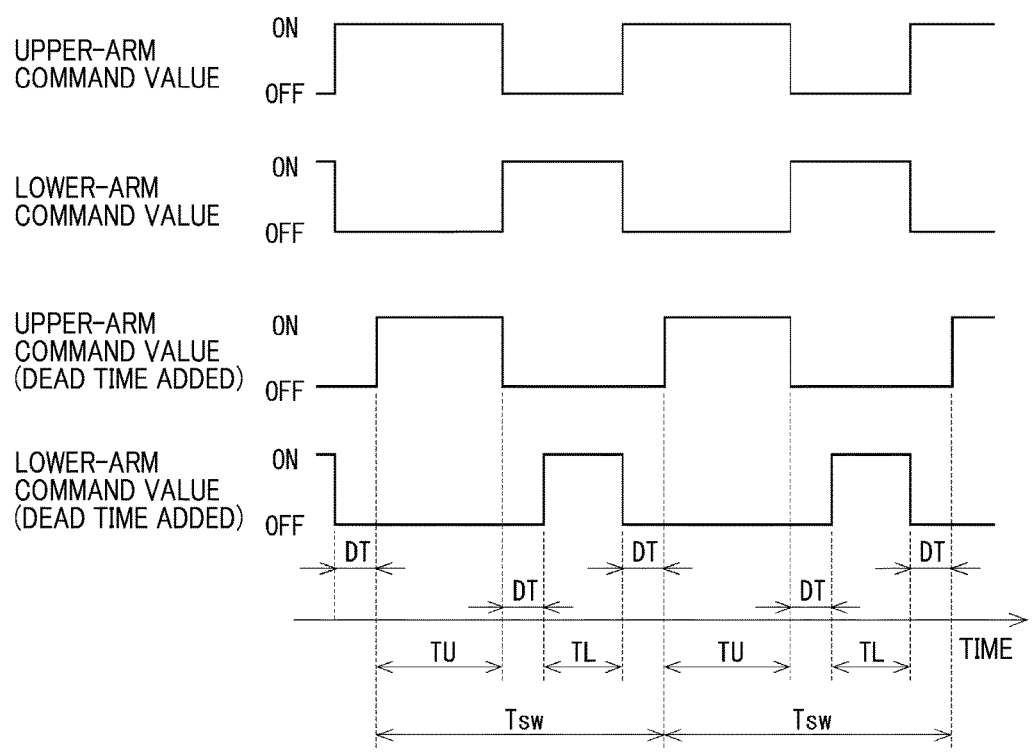
FIG. 8 is a diagram illustrating addition of dead time.

With the present embodiment, as can be understood by referring to FIG. 8, the "boost state" of the converter 20 signifies "a state in which the the high-potential side switching element 23 is continuously switched alternately to the on and the off conditions". On the other hand, the "non-boost state" is defined as "a state in which the high-potential side switching element 23 is held continuously in the on condition".

When predetermined conditions are satisfied, the voltage command value alteration unit 43 changes the voltage command reference value Vsys* calculated by the voltage command reference value calculation unit 41, with the change being made based on the judgement result from the boost state/non-boost state judgement unit 42 and on information on the spectrum amplitude of the bus current at the specific frequency, obtained from the spectrum amplitude extraction unit 71. The voltage command value alteration unit 43 outputs the changed voltage command value, designated as Vsys**, to the boost control unit 44. The specific frequency is the LC resonance frequency of the circuit through which the bus current Im flows.

Furthermore, as indicated by a broken line in FIG. 6, it would be equally possible for the voltage command value alteration unit 43 to acquire information on the voltage waveform and the modulation factor m, specified by the modulator 60 of the inverter control unit 50.

More specifically, the voltage command value alteration unit 43 executes processing to establish the boost state when the spectrum amplitude of the bus current Im at the specific frequency exceeds the predetermined judgment threshold value, as determined based on the information from the spectrum amplitude extracting unit 71, while also the judgement result obtained by the boost/non-boost state judging unit 42 is "non-boost state".

On the other hand when these predetermined conditions are not satisfied, the voltage command value alteration unit 43 outputs the input voltage command reference value Vsys* unchanged, as the post-change voltage command value Vsys**.

In particular with the MG 80 being a three-phase AC motor to which rectangular-waveform control is applied, when the rotation speed ω of the MG 80 is a value whereby the 6th order harmonic frequency of the bus current Im coincides with the LC resonance frequency, the voltage command value alteration unit 43 changes the voltage command reference value Vsys* such as to set the converter 20 in the boost state.

"Setting the boost state" signifies that, if the converter 20 is currently in the non-boost state, a transition is made to the boost state in the next control cycle. Conversely, if the converter 20 is currently in the boost state, "setting the boost state" signifies that a transition to the non-boost state in the next control cycle is inhibited, and that the boost state will be maintained unchanged. In both these cases, "processing to set the boost state" is referred to as "boost state transition processing".

On the other hand, the meaning of "transition to the non-boost state" includes both the case of a transition from the currently established boost state to the non-boost state at the next control cycle and the case of maintaining the currently established non-boost state unchanged.

The boost control unit 44 acquires the post-change voltage command value Vsys**, the power source voltage Vb, and the system voltage Vsys detected by the voltage sensor 37. The boost control unit 44 of the present embodiment also acquires the value of reactor current IL detected by the current sensor 27. If it is not necessary for the voltage command value to be changed by the voltage command value alteration unit 43, the current value Vsys* is left unchanged, as the post-change voltage command value Vsys**.

Based on these items of information, the boost control unit 44 generates gate signals CU, CL for driving the high-potential side switching element 23 and the low-potential side switching element 24 respectively. At this time, the boost control unit 44 sets a dead time DT during which the high-potential side switching element 23 and the low-potential side switching element 24 are concurrently set in the OFF state. Information on the dead time DT is notified to the voltage command value alteration unit 43.

If the post-change voltage command value Vsys is higher than the battery voltage Vb, so that boosting of the battery voltage Vb is required, the boost state is set. At this time, the converter control unit 40 generates the gate signals CU, CL such as to boost the battery voltage Vb to the post-change voltage command value Vsys, by switching the high-potential side switching device 23 and the low-potential side switching device 24 alternately to the ON state.

On the other hand if the post-change voltage command value Vsys** is equal to or lower than the battery voltage Vb, boosting is unnecessary, so that the boost state is not required. In that case, the converter control unit 40 outputs the battery voltage Vb to the inverter 30 unchanged. In the non-boost state, the high-potential side switching element 23 is held on and the low-potential side switching element 24 is held off.

With regard to boost control of the converter 20, Japanese Patent Application Laid-open No. 2014-158328, for example, discloses a technique of current mode control for controlling the boosted voltage based on the detected value of the reactor current IL. By using current mode control, the boost control unit 44 of the present embodiment can stabilize the system voltage Vsys that is outputted to the inverter 30 during boosting, and can suppress voltage fluctuation.

With the present embodiment, focusing on this point, when a specific frequency in the amplitude spectrum of the bus current Im of the inverter 30 coincides with the LC resonance frequency, and the spectrum amplitude at the specific frequency is equal to or higher than the judgement threshold value, the converter 20 is controlled to be set in the boost state. Voltage fluctuation can thereby be effectively suppressed.

The above is an outline of the configuration of the converter control unit 40.

Figure 7:
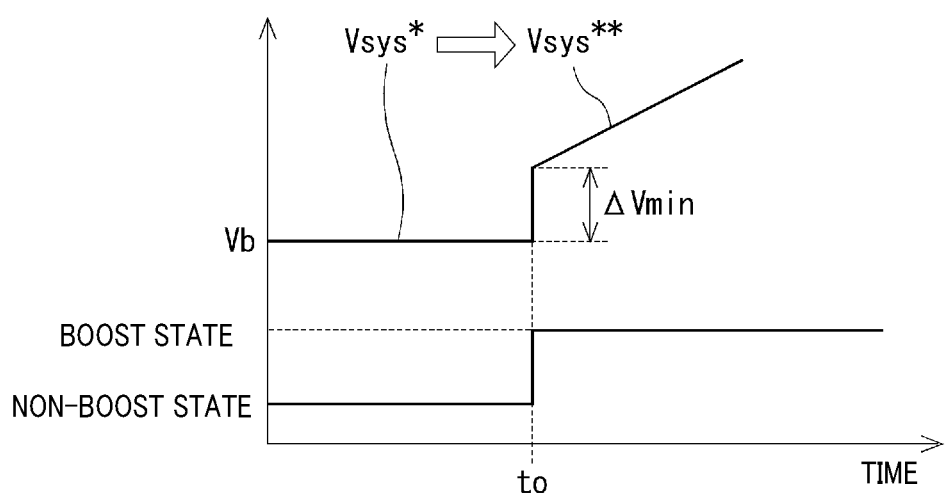
FIG. 7 is a diagram illustrating an example of change of the voltage command reference value by the voltage command value alteration unit of a first embodiment.

Further details of the parts of the converter control unit 40 are described in the following. Firstly, FIG. 7 shows a basic example (for the first embodiment) relating to changing the voltage command reference value Vsys* by the voltage command value alteration unit.

In the non-boost state before time point to, the voltage command reference value Vsys* is equal to the power source voltage Vb. When it is judged at time point to that it is necessary to transition from the non-boost state to the boost state, the voltage command value alteration unit 43 changes the voltage command reference value Vsys* to a post-change voltage command value Vsys** which is greater than the power source voltage Vb. Transition from the non-boost state to the boost state may be paraphrased as "prohibiting continuation of the non-boost state".

The minimum value of increment ΔVmin of the post-change voltage command value with respect to the power source voltage Vb may be appropriately set in accordance with the control response characteristics, control error, etc. For example, the minimum increment ΔVmin may be set based on the dead time DT, described in the following.

As specific means for the voltage command reference value calculation unit 41 or the voltage command value alteration unit 43 to prohibit the non-boost state, the following concept may be envisaged. This applies not only to the case in which the voltage command value alteration unit 43 sets the post-change voltage command value Vsys but also to the case in which the voltage command reference value calculation unit 41** initially sets a suitable value of the command reference value Vsys*.

[1] As described above, the voltage command value (Vsys* or Vsys**) is changed to a value greater than the power source voltage Vb.

[2] The voltage command value (Vsys* or Vsys**) is set equal to or greater than "the voltage command value required to boost the voltage sufficiently to compensate for a voltage drop due to the dead time DT". For example, when the voltage command value is in the LC resonance region, the higher one of the "voltage command value required to boost for dead time compensation" and the "voltage command value required to reduce system losses" is selected.

As shown in FIG. 8, the dead time DT is the sum of the on period TU of the high-potential side switching element 23 ("upper arm" in FIG. 8) during the switching period Tsw and the on period TL of the low-potential side switching element 24 ("lower arm" in FIG. 8). If the dead time DT that elapses from a falling edge of the upper-arm command value to a rising edge of the lower-arm command value is equal to the dead time DT from a falling edge of the lower-arm command value to a rising edge of the upper-arm command value, the dead time ratio $R_{DT}$ is expressed by equation (4) below.

$$R_{DT}=2DT/Tsw \qquad (4)$$

It is preferable that the voltage command value alteration unit 43 sets the voltage command value such as to provide a voltage boost that compensates for a voltage reduction caused by the dead time DT.

[3] The voltage command value (Vsys* or Vsys**) is set to be higher than "the lowest voltage value that does not produce a transition to the non-boost state". This concept assumes the use of a system in which the judgement concerning transition to the non-boost state is based upon voltage values. For example, in setting the voltage command value in the LC resonance region, the higher one of "the lowest voltage value that does not cause a transition the non-boost state" and "the voltage command value required to reduce system losses" is selected.

The "voltage command value required to reduce system losses" in [2] or [3] can be obtained, for example with rectangular-waveform control, by setting the current command vector to follow an optimum current advance angle line, as disclosed in Japanese Patent No. 5618948.

As shown in FIG. 7 (configuration of first embodiment), the boost state/non-boost state judgement by the boost state/non-boost state judgement unit 42 is performed by comparing the power source voltage Vb with the voltage command reference value Vsys*. Configurations for judging the boost/non-boost state by other methods will be described with reference to FIG. 9, for second and third embodiments.

With the second embodiment, the system voltage Vsys is used as information acquired by the boost/non-boost state judgement unit 42, as indicated by a single-dot chain line in FIG. 6.

Figure 9A:
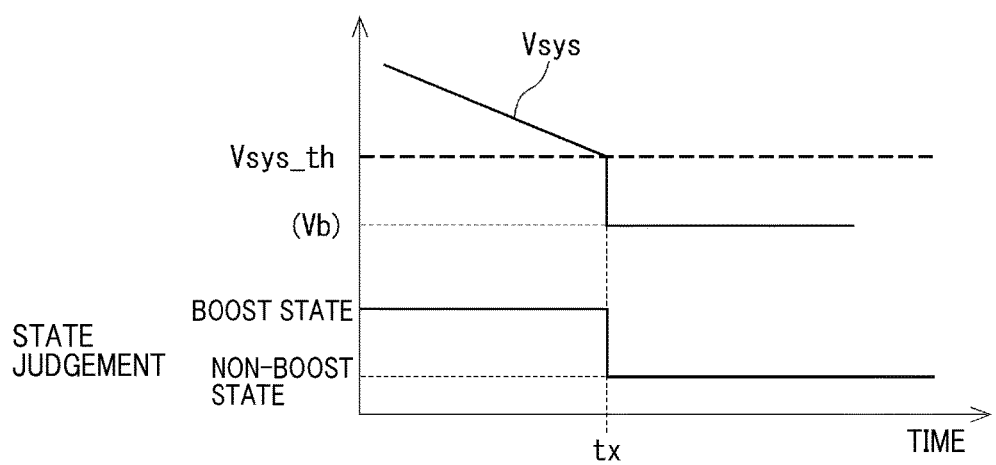
FIG. 9A is a diagram illustrating an example of judging the boost/non-boost state of a second embodiment.

With the second embodiment as shown in FIG. 9A, a threshold value Vsys_th is set for the system voltage Vsys. The boost state/non-boost state judgement unit 42 acquires the detected value of the system voltage Vsys, detected by the voltage sensor 37. In FIG. 9A prior to time tx, in the boost state, the system voltage Vsys is higher than the threshold value Vsys_th. Subsequently when the system voltage Vsys falls below the threshold value Vsys_th at time tx, the boost/non-boost state judgement unit 42 determines that a request for transition from the boost state to the non-boost state has occurred, and notifies this to the voltage command value alteration unit 43.

If the spectrum amplitude of the bus current at the specific frequency is equal to or higher than the judgement threshold value at this time, the voltage command value alteration unit 43 changes the voltage command reference value Vsys* to a value higher than the system voltage threshold Vsys_th.

Figure 9B:
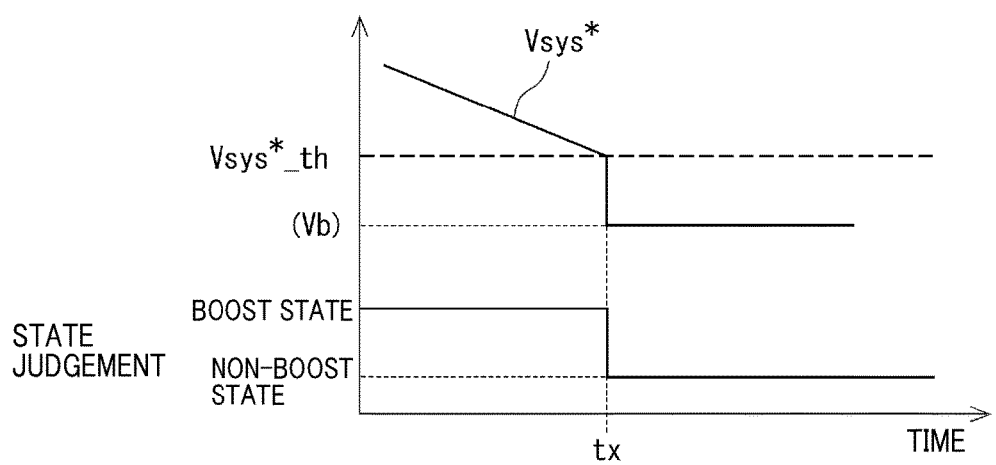
FIG. 9B is a diagram illustrating an example of judging the boost/non-boost state of a third embodiment.

With the third embodiment as shown in FIG. 9B, a threshold value Vsys*_th is set for the voltage command reference value Vsys*. The boost state/non-boost state judgement unit 42 acquires the voltage command reference value Vsys* calculated by the voltage command reference value calculation unit 41. In FIG. 9B, prior to time tx, in the boost state, the voltage command reference value Vsys* is higher than the threshold value Vsys*_th. Subsequently when the voltage command reference value Vsys* falls below the threshold value Vsys*_th, at time tx, the boost/non-boost state judgement unit 42 judges that there is a request for transition from the boost state to the non-boost state, and notifies this to the voltage command value alteration unit 43.

If the spectrum amplitude of the bus current at the specific frequency is equal to or greater than the judgement threshold value at this time, the voltage command value alteration unit 43 changes the voltage command reference value Vsys* to a value that is higher than the threshold value Vsys*_th.

In addition, with the second and third embodiments, it is preferable that the system voltage threshold value Vsys_th and the reference value threshold value Vsys*_th are set equal to or greater than the minimum value of the voltage command value required to boost for dead time compensation. In this way it becomes possible to prevent the non-boost state from being entered due to the dead time.

The spectrum amplitude extraction unit 71 acquires the bus current Im of the inverter 30 and extracts the spectrum amplitude of the bus current Im at the specific frequency, using the fast Fourier transform ("FFT" in the drawings), a map, etc.

Figure 5B:
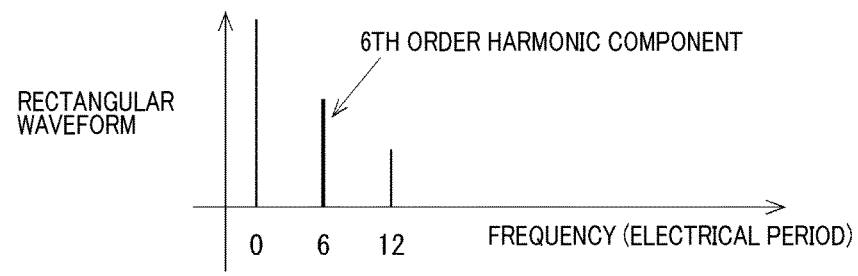
FIG. 5B is a spectrum diagram of the inverter bus current when the phase voltage is applied to the motor, for each of the embodiments.
Figure 5B:
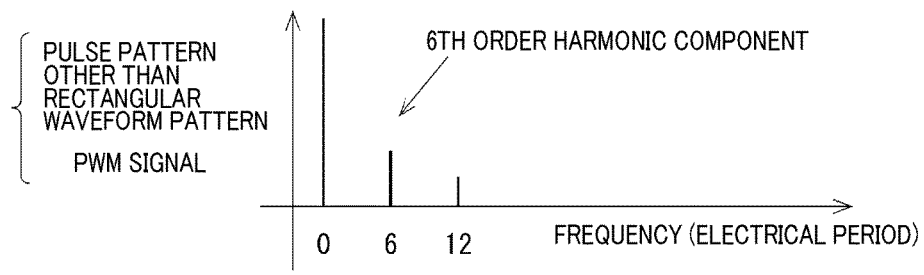

As described above, the distribution of the spectrum amplitude values of the bus current Im of the inverter 30 varies depending upon the output voltage waveform that is specified by the voltage waveform specifying unit 63. As shown in FIG. 5B for example, when outputting a rectangular waveform by torque feedback control, the spectrum amplitude of the 6th-order harmonic component is high, by comparison with the case of outputting a pulse pattern other than a rectangular waveform or a PWM waveform.

Designating the frequency of the 6th- order harmonic component, calculated based on the rotation speed ω, as the "specific frequency", voltage fluctuation due to resonance may become large if the specific frequency matches the LC resonance frequency of the converter 20.

The amplitude spectrum of the bus current Im can be calculated by methods such as the following:

[1] The calculation is performed by sequentially applying the fast Fourier transform to the bus current Im. As an alternative to detecting the value of bus current Im by the current sensor 38, the value may be calculated by dividing the product of the detected value or command value of the phase current and the phase voltage by the inverter voltage.

Figure 10:
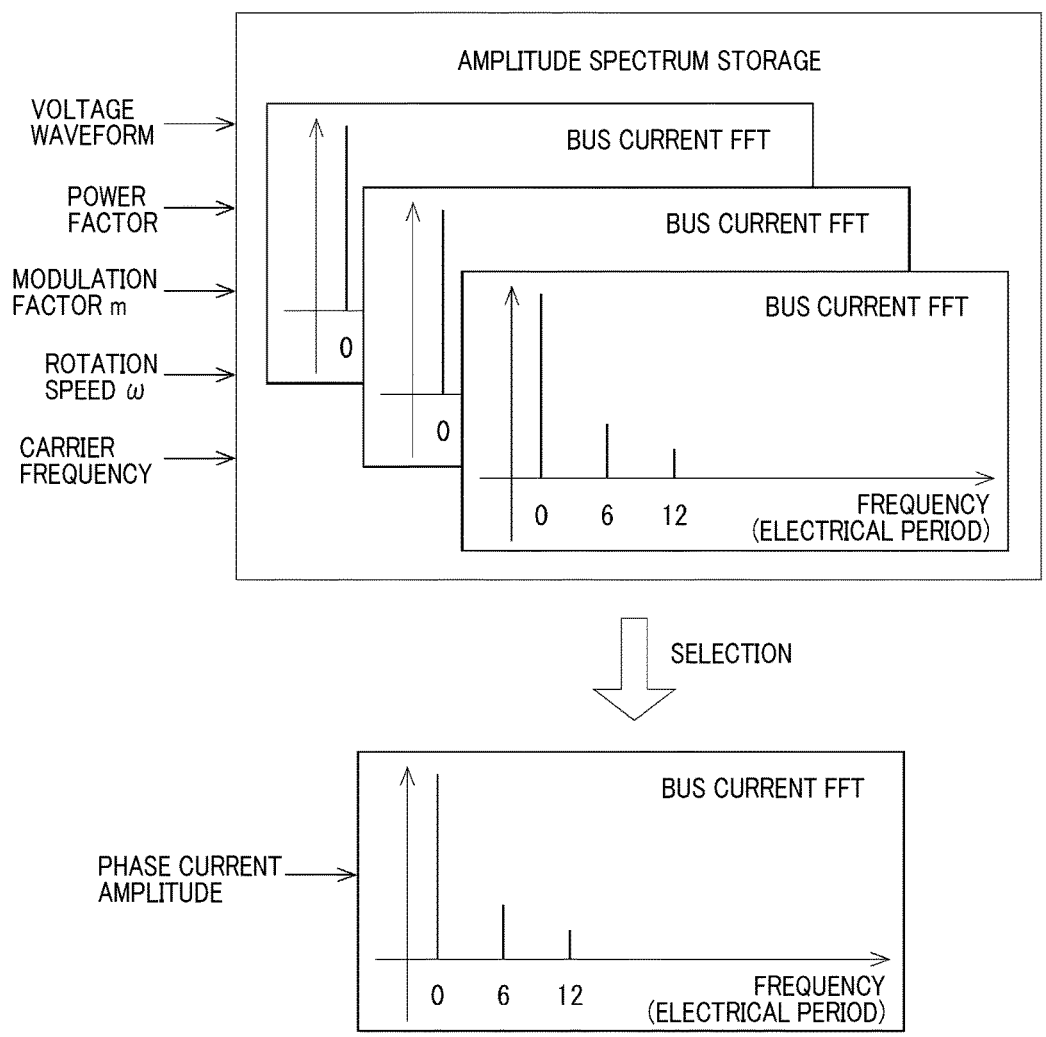
FIG. 10 is a diagram showing an example of a method of calculating an amplitude spectrum.

[2] As shown in FIG. 10, a plurality of amplitude spectrums of the bus current Im are derived beforehand by spectral analysis and stored. An appropriate one of these spectra is selected in accordance with the voltage waveform, the power factor, the modulation factor m, the rotation speed ω and the carrier frequency, and the amplitude values in the selected spectrum are corrected based on the phase current amplitude.

Figure 11:
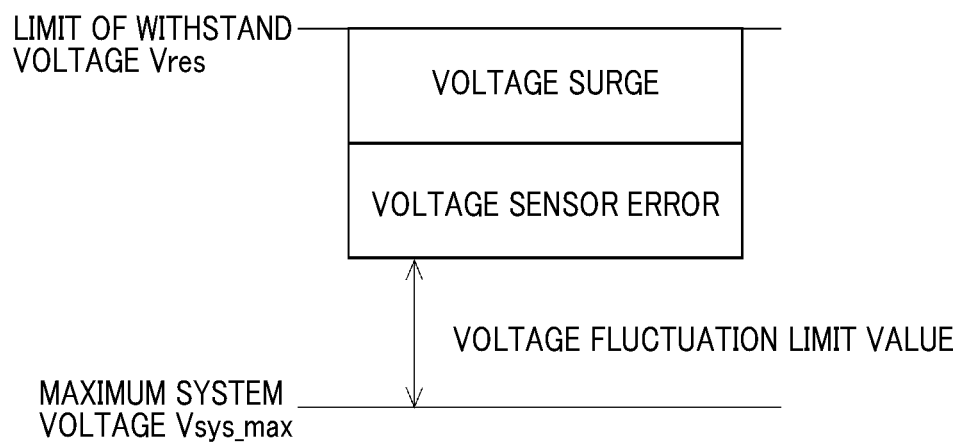
FIG. 11 is a diagram showing an example of setting judgement thresholds of an amplitude spectrum.

The judgement threshold for the spectrum amplitude of the bus current Im at the specific frequency is preferably established by using one of the two following methods:

[1] The value may be determined such that fluctuation of the system voltage Vsys will be held below a predetermined limit value As shown in FIG. 11 for example, the voltage fluctuation limit value is obtained by subtracting the sum of the amount of voltage surge accompanying the switching operation of the switching elements 31-36 and the detection error of the voltage sensor 37 from a difference between the upper limit of withstand voltage Vres and the maximum system voltage Vsys.

[2] The amplitude of the 6th-order harmonic component in the amplitude spectrum of a rectangular waveform may be used as a reference value, with the judgement threshold value being set as that reference value, or as 50% of the reference value.

Figure 12:
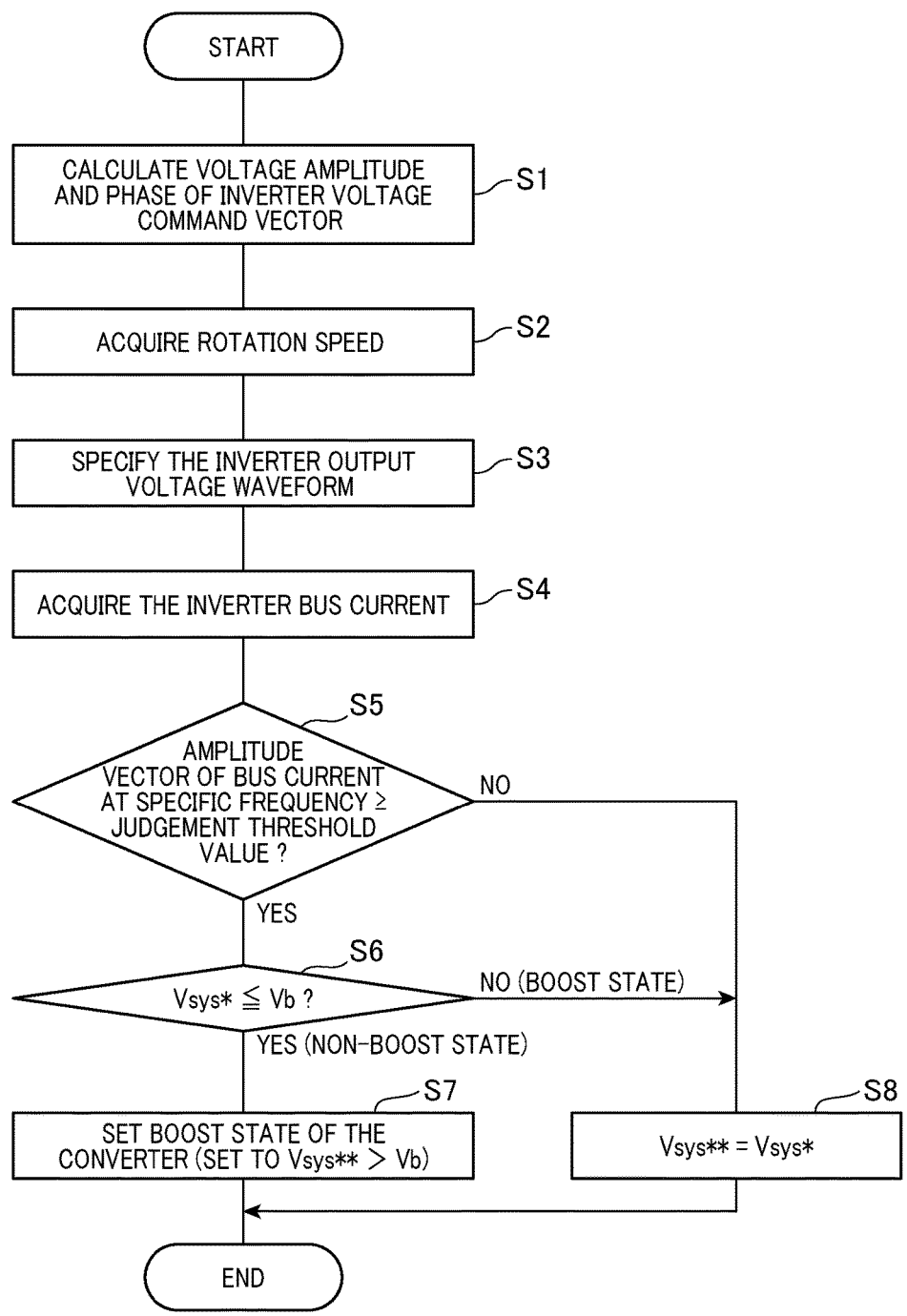
FIG. 12 is a flowchart of boost state transition processing, for each of the embodiments.

A flowchart of the boost state transition processing is shown in FIG. 12. In the following description of the flowchart, the symbol "S" signifies a step. The control subject of each step of the flowchart is the converter control unit 40 or the inverter control unit 50. In S1, the current feedback control unit 580 calculates the voltage amplitude Vr and the torque feedback control unit 540 calculates the voltage phase φ, to thereby obtain the voltage vector.

In S2, the rotation speed w is acquired.

In S3, the voltage waveform specifying unit 63 specifies the output voltage waveform of the inverter.

In S4, the spectrum amplitude extraction unit 71 acquires the inverter bus current Im.

In S5, a decision is made as to whether or not the spectrum amplitude of the bus current Im at the specific frequency, extracted by the spectrum amplitude extraction unit 71, is equal to or greater than the judgement threshold value. If the results is NO at S5, processing proceeds to S8.

If the results is YES in S5, a decision is made in S6 as to whether the voltage command reference value Vsys* based on the system request is equal to or less than the power source voltage Vb. If the voltage command reference value Vsys* is equal to or less than the power source voltage Vb, so that there is a YES decision in S6, it is judged that there is a request to maintain the current non-boost state or a request to transition from the current boost state to the non-boost state. In that case, processing proceeds to S7.

On the other hand, if the voltage command reference value Vsys* exceeds the power source voltage Vb, so that there is a NO decision in S6, it is judged that there is a request to maintain the current boost state or a request to transition from the existing non-boost state to the boost state. In that case, processing proceeds to S8

In S7, in order to apply boost control for suppressing voltage fluctuation due to LC resonance, the post-change voltage command value Vsys** is reset to a value higher than the power source voltage Vb, so that the converter 20 transitions to the boost state.

On the other hand in S8, since it is unnecessary to suppress voltage fluctuation due to LC resonance, the voltage command reference value Vsys* based on the system requirements is outputted unchanged, as the post-change voltage command value Vsys**.

This concludes the boost state transition processing.

As described above, when the spectrum amplitude of the bus current Im at the specific frequency corresponding to the LC resonance frequency is equal to or higher than the judgement threshold, and the non-boost state is established, the MG control apparatus 10 of the present embodiment changes the voltage command reference value Vsys* such as to set the converter 20 in the boost state.

As a result, the MG control apparatus 10 of the present embodiment can appropriately suppress voltage fluctuation of the system voltage Vsys, without using the prior art technique of always applying the sinusoidal waveform control method when the MG is operating within the LC resonance region, and thereby increasing system losses.

Other Embodiments (M1) With the above embodiment, the boost control unit 44 of the converter control unit 40 stabilizes the system voltage Vsys by using a current mode control method that is based on the reactor current IL detected by the current sensor 28. With other embodiments, the boost control unit 44 may stabilize the system voltage Vsys by methods other than current mode control. Regardless of which boost control method is adopted, if it is possible to suppress voltage fluctuation by using boost control even when the frequency of the 6th- order harmonic component of the inverter output voltage waveform matches the LC resonance frequency, the present invention is applicable.

(M2) With the above embodiment, a state in which the on-state and the off-state of the high-potential side switching element 23 are continuously alternating is defined as the boost state. However it would be equally possible to define the boost state based on the state of increase/decrease of the reactor current IL, etc.

(M3) With the above embodiment, envisaged as a control apparatus for a three-phase AC motor, attention has been centered on the frequency of the 6th-order harmonic component (with its 12th-order, 18th-order etc., multiples) as a frequency of voltage fluctuation which produces a strong effect upon the voltage when it coincides with the LC resonance frequency. With rectangular-waveform control, the 6th-order harmonic component etc., appear in the amplitude spectrum of the bus current Im. Hence, the boost state transition processing of the present invention is particularly effective when applied to a control apparatus which performs rectangular-waveform control of a three-phase AC motor.

However even with a pulse pattern other than a rectangular waveform, the proportion of the 6th-order harmonic component etc., of the bus current may be large. In that case, it would be possible for example to use a map relating pulse patterns, motor current amplitude values and power factor values to calculate the amplitude of the 6th-order harmonic component of the bus current Im from the voltage waveform of a pulse pattern and the motor current. A voltage waveform that is to be the object of processing can thereby be selected, by using as an index the condition that (when the selected voltage waveform is applied) the amplitude of the 6th-order harmonic component is above a predetermined value.

(M4) Furthermore, the present invention is equally applicable to a system which drives a polyphase AC motor having four or more phases. Moreover the invention is not limited in application to a permanent magnet type of synchronous motor, but would be applicable to an induction motor or other type of synchronous motor. Depending on the characteristics of such an electric motor, the harmonic components of the bus current Im which appear most prominently in the amplitude spectrum will change over time.

(M5) The inverter control unit is not limited to use of feedback control, and the voltage vector may be calculated by feedforward control.

(M6) The AC motor control apparatus of the present invention may be applied not only to the MG drive system of a hybrid vehicle or an electric vehicle but also to a drive system of an AC motor for any purpose, such as for general machinery.

As described above, the present invention is not limited to the above embodiments, and may be implemented in various forms without departing from the scope claimed for the invention.

What is claimed is:

1. A control apparatus for an AC motor, comprising:
   a converter capable of boosting a power source voltage supplied from a battery to a required system voltage by operation of a high-potential side switching element and a low-potential side switching element;
   an inverter for converting DC power which is at the system voltage, outputted from the converter, to AC power by operation of a plurality of switching elements, and supplying the AC power to an AC motor;
   a converter control unit for calculating a voltage command value of the system voltage, and controlling the operation of the converter;
   an inverter control unit having a voltage command calculation unit for calculating a voltage vector that is notified to the inverter, and a voltage waveform specifying unit that specifies a voltage waveform, for operating the inverter based on the voltage vector; and
   a spectrum amplitude extraction unit for acquiring a bus current of the inverter and extracting a spectrum amplitude of the bus current at a specific frequency, the specific frequency corresponding to a resonance frequency of an LC circuit of the converter, through which the bus current flows,
   wherein the converter control unit comprises:
   a voltage command reference value calculation unit for calculating a voltage command reference value as a reference value of the voltage command value, based on a torque and a rotation speed of the AC motor;
   a boost state/non-boost state judgement unit for judging whether a control state requested for a succeeding control cycle of the converter is a boost state, in which the power source voltage is boosted and outputted, or is a non-boost state, in which the power source voltage is outputted without being boosted; and
   a voltage command value alteration unit for changing a voltage command reference value such as to set the converter in the boost state when the spectrum amplitude at the specific frequency, correlated with the voltage waveform, exceeds a judgement threshold value while also the judgement result from the boost state/non-boost state judgement unit is the non-boost state.

2. The control apparatus for an AC motor according to claim 1, wherein the voltage command value alteration unit changes the voltage command reference value to a value that is higher than the power source voltage, when the converter is to transition from the non-boost state to the boost state.

3. The control apparatus for an AC motor according to claim 1, wherein
   when the detected value of the system voltage becomes lower than the system voltage threshold value, the boost/non-boost state judgement unit judges that there is a request for the converter to transition from the boost state to the non-boost state, and
   when the spectrum amplitude at the specific frequency is equal to or higher than the judgement threshold value, the voltage command value alteration unit changes the voltage command reference value to a value higher than a system voltage threshold value.

4. The control apparatus for an AC motor according to claim 1, wherein
   when the voltage command reference value becomes lower than a system voltage threshold value, the boost/non-boost state judgement unit judges that there is a request for the converter to transition from the boost state to the non-boost state, and
   when the spectrum amplitude at the specific frequency exceeds the judgement threshold value, the voltage command value alteration unit changes the voltage command reference value to a value higher than the reference threshold value.

5. The control apparatus for an AC motor according to claim 1, wherein
   a dead time is set by the converter, between an ON period of the high-potential side switching element and an ON period of the low-potential side switching element, and
   the voltage command value alteration unit changes the voltage command reference value to a value that is greater than or equal to a value required to provide a voltage boost which compensates for a voltage drop caused by the dead time.

6. The control apparatus for an AC motor according to claim 1, wherein
   the voltage command calculation unit comprises a current feedback control unit for calculating a voltage vector as an operation quantity for feedback control of current flowing in the AC motor,
   the voltage waveform specifying unit comprises at least one of a pulse pattern generating unit and a PWM signal generating unit, the pulse pattern generating unit selects one of a plurality of predetermined pulse patterns that have been stored beforehand, the selection being based upon a modulation factor that is calculated from values of voltage amplitude and system voltage that are outputted from the current feedback control unit and upon the rotation speed of the AC motor, and the PWM signal generating unit generates a PWM signal by comparing a phase voltage with a carrier wave, the phase voltage being calculated based on an output of the current feedback control unit.

7. The control apparatus for an AC motor according to claim 6, wherein the voltage command calculation unit further comprises a torque feedback control unit, for calculating the phase of the voltage vector, as an operation amount for feedback control of the torque of the AC motor, the voltage waveform specifying unit comprises a pulse pattern setting unit, and when the voltage vector is calculated by the torque feedback control unit, the pulse pattern setting unit selects a rectangular-waveform pulse pattern having one pulse in each period.

8. The control apparatus for an AC motor according to claim 7, wherein when the voltage waveform specified by the voltage waveform specifying unit is a rectangular waveform, the voltage command calculation unit halts control by the current feedback control unit and effects calculation of the voltage vector by the torque feedback control unit.

9. The control apparatus for an AC motor according to claim 8, wherein the AC motor is a three-phase AC motor, and wherein when the voltage waveform specified by the voltage waveform specifying unit is a rectangular waveform, and the rotation speed of the AC motor is such that the frequency of the 6th- order harmonic component of the bus current coincides with the resonance frequency of the LC circuit, the voltage command value alteration unit changes the voltage command reference value such that the converter transitions to the boost state.

10. The control apparatus for an AC motor according to claim 1, wherein the boost state of the converter is a state in which the ON state and the OFF state of the high-potential side switching element continuously alternate.

\* \* \* \* \*